United States Patent Office 3,711,450
Patented Jan. 16, 1973

3,711,450
AIR-CURABLE POLYTHIOL POLYMERS
George F. Bulbenko, 48 Roundhill Road,
Levittown, Pa. 19012
No Drawing. Continuation of abandoned application Ser.
No. 31,431, Apr. 10, 1970. This application Apr. 20,
1971, Ser. No. 135,769
Int. Cl. C08g 23/00
U.S. Cl. 260—79
16 Claims

ABSTRACT OF THE DISCLOSURE

Air-curable polythiol polymers are prepared by reacting primary or secondary amine-containing polymers having an aliphatic hydrocarbon backbone, optionally containing O, N, S, Si, or halogen atoms in the molecule, with ethylene sulfide to convert the amine groups to

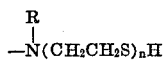

groups, where R is H, lower alkyl or —CH$_2$CH$_2$SH and n=1 to 5, preferably 1.

---

This is a continuation of application Ser. No. 31,431, filed Apr. 10, 1970, and now abandoned.

BACKGROUND OF THE INVENTION

This invention relates to air-curable polythiol polymers and to a process for their preparation.

The oxidative curing of polythiol polymers whereby mercaptan groups on adjacent molecules join to form a disulfide bond is well-known. Usually this is accomplished by the use of an organic or inorganic oxidizing agent and optionally an acid or basic accelerator. Some curing agents also require the presence of moisture or heat to initiate a cure. Because of the expense and/or inconvenience is using these types of cures, the desirability of utilizing oxygen in the air as the oxidizing agent is obvious. This has been accomplished by the incorporation of a catalyst comprising a paint drier and a chelating agent as described in U.S. Pat. 3,247,138. However, these compositions are relatively slow curing and have the disadvantage of being colored and therefore unsuitable for white or transparent compositions. Without a catalyst, known prior art polythiol polymers cure very slowly in air, if at all. The novel, air-curable polymers of the present invention are colorless and do not require an added curing agent or catalyst to effect a comparatively rapid cure when exposed to air.

SUMMARY OF THE INVENTION

Therefore it is an object of the present invention to provide colorless polythiol polymers which are inherently air-curable and which do not require an added catalyst or curing agent to effect a comparatively rapid cure. It is another object of the invention to provide a process for the preparation of these polymers.

These objects are accomplished by treating primary or secondary amine-containing polymers with at least a stoichiometric amount of ethylene sulfide to provide polythiol polymers having

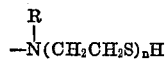

groups, where n has a value of 1 to 5, preferably 1, and R is H, lower alkyl or —CH$_2$CH$_2$SH. It has been found that polymers containing these groups are readily oxidized by air without the addition of catalysts, since the amine group acts as a built-in basic oxidation catalyst.

The polymers of the invention may be used in coating or sealing compositions for metal, wood, glass, concrete and the like.

DESCRIPTION OF THE PREFERRED EMBODIMENTS

The starting material for making the polymers of the present invention may be any liquid or low melting polymer having a molecular weight of about 500 to about 10,000 and having 2 to 5, preferably 2 to 3 primary or secondary amine groups and an aliphatic hydrocarbon backbone, Q, which may contain intervening groups selected from ether, thioether, silane, ester, urethane, urea carbonyl or polysulfide groups and may contain pendant alkyl, halogen or hydroxyl groups. It may contain a secondary amine, i.e. imine group in the backbone which would act as a crosslinking site but a large number of such groups would provide too much crosslinking, resulting in a hard brittle polymer not well adapted to coating or sealant compositions. When Q is the polysulfide group, it may have the structure

wherein x is an integer from about 6 to 42. Additionally Q may have repeating units of the structure

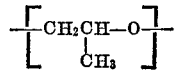

The actual structure of Q is not critical and the only requirement is that it have amine terminals or be capable of reacting with an imine to produce the amine terminals.

When these amine-containing polymers are reacted with ethylene sulfide, the resultant polythiol polymers may be represented by the structure:

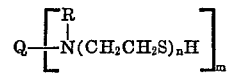

where R is H, lower alkyl, or —CH$_2$CH$_2$SH, Q is as defined above, m equals 2 to 5 and corresponds to the number of amine groups present in the starting material and n equals 1 to 5 and depends upon the amount of ethylene sulfide used in the reaction. R is preferably H and the preferred value of n is 1, since as n is increased, the solubility and reactivity of the polymer decreases and the hardness increases. In order to obtain the desirably low value of n, no more than about 10% stoichiometric excess of ethylene sulfide should be used. The reaction temperature may be from about 0° C. to 100° C. depending upon the reactivity of the amine groups. At elevated temperatures, the reaction should be carried out in a bomb to prevent the loss of ethylene sulfide.

The rate at which the polymers of the invention will cure, especially in a relatively thick layer, such as found in a sealant composition, depends upon the permeability of the polymer to oxygen. Polyethers are particularly preferred for this reason. Polysulfide groups tend to decrease oxygen permeability.

Amine terminated polyethers are commercially available materials. Other amine terminated polymers may be prepared from —SH terminated polymers by reaction with ethylene imine as described in U.S. Pat. 3,322,851 and illustrated in Example I.

EXAMPLE I

Preparation of amine-terminated polysulfide polymer

Ethylene imine (55 g., 10% excess) was added dropwise over a period of 30 minutes to 500 g. of a polysulfide polymer having the average structure $$HS(C_2H_4OCH_2OC_2H_4SS)_6C_2H_4OCH_2OC_2H_4SH$$

containing 7.7% SH and about 2% crosslinking. The mixture was allowed to react in a nitrogen atmosphere for 2.5 hrs. @ 25° C. followed by 5 hrs. @ about 48° C. Analysis showed that the —SH terminals had been only partially aminoethylated at this stage. Another addition of ethylene imine (27 g.) was made over a period of 30 minutes, and the mixture was allowed to react for 2 hrs. @ 25° C. followed by 6.5 hrs at about 67° C. The product was filtered and vacuum-stripped to give a 96% yield of an amine-terminated polysulfide polymer having 3.00% N (calcd. 2.96%) and 0.1% SH.

Preparation of mercaptoethyl-aminoethyl terminated polymer

A solution of ethylene sulfide (13 g. in 25 ml. of benzene) was added dropwise with vigorous stiring and external cooling in an ice bath, to 100 g. of the previously prepared amine-terminated polymer. The mixture was warmed to room temperature and transferred to a steel bomb, which was then flushed with nitrogen, sealed, and heated for 20 hours at 100° C. The product was filtered and the solvent was removed under vacuum. Analysis showed a mercaptan content of 7.85%. Some of the above polymer was coated on a glass slide and exposed to air at about 23° C. and 50% relative humidity. The polymer cured within 24 hrs. whereas the untreated polysulfide polythiol starting material was still uncured after 144 hrs. under the same conditions.

EXAMPLE II

A 400 g. sample of a commercially available amine-terminated polypropylene glycol polyether, having a molecular weight of about 2000 and an —NH₂ content of about 1.6%, was dried by heating with 350 g. of reagent grade benzene to 80–90° C. for 2 hrs. and removing water azeotropically. Ethylene sulfide (40 g.) was added to the cooled mixture which was placed in a steel bomb for 2½ hrs. at room temperature, followed by 16 hrs. at 76° C. Activated charcoal was added to the mixture which was heated and then filtered. The polymer was dried and separated from the benzene first with an aspirator, then with a vacuum pump at 50° C. and 1.5–1.25 mm. The polymer had an SH content of 2.35–2.38%. It was stable in a closed package for at least 3 days at 50° C. A bead of the polymer cured upon exposure to air at 30% relative humidity for 13 days without the addition of a catalyst.

EXAMPLE III

A mixture of 400 g. of the same polymer used in Example II, except that it was not dried, ethylene sulfide (50 g.) and benzene (200 g.) was placed in a steel bomb and heated in a rotating bath for 16 hrs. at 80° C. Volatile materials were removed by suction in a rotodryer. The product was a clear, thin, pale yellow liquid polymer, having a molecular weight of about 3431, percent S=5.0 and percent SH=2.9. The polymer was stable for 15 months in a closed container at room temperature. A thin skin formed in 1 day and a thick skin formed in two days when a bead of the polymer was exposed to the air. A sample of the polymer was dissolved in benzene and tested for oxidizability in an oxygen-filled bottle. In 16 hrs., 81% of the SH groups were oxidized and the solution thickened. A little of the solution was poured on a watch glass and allowed to evaporate in air, resulting in colorless, tacky film.

Although the advantage of the polymers of the present invention resides in the fact that they are air curable, it is of course possible to cure them with the usual oxidative curing agents for polythiols, if an accelerated cure using a particular curing agent is desired.

For use in commercial coating or sealing compositions, the usual adjuvants, e.g. plasticizers, fillers, pigments, adhesion additives and the like, may be added as desired.

By applying the process of the present invention to amine-containing polymers of a wide variety of backbones, new polythiol polymers are obtained which, when cured, provide cured compositions having a combination of the properties derived from the backbone and from the disulfide linkage formed during curing. The disulfide groups provide more solvent resistance in the cured composition than it would have if these groups were not present.

I claim:
1. An air curable polythiol polymer having a molecular weight of about 500 to 10,000 and having a structure

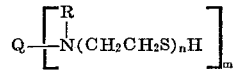

wherein m is an integer equal to 2 to 5, n is an integer equal to 1, R is H, lower alkyl or —CH₂CH₂SH and Q is an aliphatic hydrocarbon radical which contains an intervening group which is an ether, thioether, silane, ester, imine, urethane, urea, carbonyl or polysulfide group.

2. An air curable polythiol polymer as in claim 1 in which said intervening group is an ether, silane, ester, imine, urethane, urea, carbonyl or polysulfide group.

3. An air curable polythiol polymer as in claim 1 in which said intervening group is a silane, ester urethane, urea, carbonyl or polysulfide group.

4. An air curable polythiol polymer as in claim 1 in which Q is the said polysulfide group having the structure —S(C₂H₄OCH₂OC₂H₄SS)ₓC₂H₄OCH₂OC₂H₄S—, wherein x is an integer from 6 to 42.

5. An air curable polythiol polymer as in claim 1 in which Q has repeating units of the structure

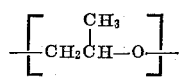

6. An air curable polythiol polymer as in claim 1 wherein R is H.

7. An air curable polythiol polymer as in claim 6 in which Q is the said polysulfide group having the structure —S(C₂H₄OCH₂OC₂H₄SS)ₓC₂H₄OCH₂OC₂H₄S—, wherein x is an integer from 6 to 42.

8. An air curable polythiol polymer as in claim 6 in which Q has repeating units of the structure

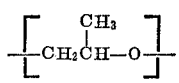

9. A process for preparing an air-curable polythiol polymer which comprises reacting ethylene sulfide with a polymer having 2 to 5 primary or secondary amine groups and an aliphatic hydrocarbon radical, Q, which contains an intervening group which is an ether, thioether, silane, ester, imine, urethane, urea, carbonyl, or polysulfide group to form the corresponding polymer

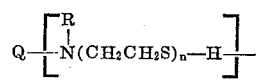

said corresponding polymer having a molecular weight of about 500 to 10,000, wherein R is H, lower alkyl or —CH₂CH₂SH, n is equal to 1 and m=the number of said primary or secondary amine groups.

10. A process as in claim 9 wherein the reaction is carried out in the presence of an inert solvent.

11. A process as in claim 9 wherein R is H.

12. A process as in claim 11 wherein the polymer having a plurality of amine groups is a liquid, polysulfide polymer.

13. A process as in claim 11 wherein the polymer having a plurality of amine groups is a liquid, polyether polymer.

14. An air-cured composition obtained from the polymer of claim 1.

15. An air-cured composition obtained from the polymer of claim 7.

16. An air-cured composition obtained from the polymer of claim 8.

References Cited
UNITED STATES PATENTS 3,509,112   4/1970   Cameron _____ 260—79

FOREIGN PATENTS 1,576,960   8/1969   France _____ 260—79
1,193,335   5/1970   Great Britain _____ 260—79

DONALD E. CZAJA, Primary Examiner

M. I. MARQUIS, Assistant Examiner

U.S. Cl. X.R.

117—124 E; 260—25, 77.5 AQ, 77.5 B, 77.5 C, 823, 858